(12) United States Patent
Watson

(10) Patent No.: US 6,682,665 B2
(45) Date of Patent: Jan. 27, 2004

(54) TEMPERATURE INDICATING PAINT

(75) Inventor: Hugh M L Watson, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 10/226,188

(22) Filed: Aug. 23, 2002

(65) Prior Publication Data

US 2003/0044986 A1 Mar. 6, 2003

(30) Foreign Application Priority Data

Sep. 4, 2001 (GB) ................................. 0121312

(51) Int. Cl.⁷ ................................. G01N 31/22
(52) U.S. Cl. ................................. 252/408.1; 116/207
(58) Field of Search ................ 252/408.1; 436/2; 116/207, 216

(56) References Cited

U.S. PATENT DOCUMENTS 4,925,727 A * 5/1990 Brown et al. ........... 116/216 X
5,340,387 A * 8/1994 Smith

FOREIGN PATENT DOCUMENTS

| DE | 1669136 A | * | 5/1971 |
| GB | 1103059 P |   | 2/1968 |
| GB | 2204874 A |   | 11/1988 |
| SU | 381922 T  | * | 5/1973 |
| SU | 433194 T  | * | 6/1974 |

OTHER PUBLICATIONS

Inaba, K., et al. "Thermoindicators," (abstract) J. Sci. Research. Inst. (Tokyo) (1949), 43, 29–33 (261–5).*

* cited by examiner

*Primary Examiner*—Elizabeth McKane
(74) *Attorney, Agent, or Firm*—W. Warren Taltavull; Manelli Denison & Selter PLLC

(57) ABSTRACT

An irreversible temperature indicating paint comprise 15 to 18 wt % cobalt ammonium phosphate, 5.0 to 6.0 wt % sodium alumino sulpho silicate, 8.5 to 10.5 wt % silica, 7.0 to 8.5 wt % alumina, 0.5 to 0.7 wt % toluidine red, 35 to 43 wt % acrylic resin and 19 to 23 wt % silicone resin excluding solvent. A particular irreversible temperature indicating paint comprising 16.4 wt % cobalt ammonium phosphate, 5.5 wt % sodium alumino sulpho silicate, 9.4 wt % silica, 7.8 wt % alumina, 0.6 wt % toluidine red, 39.1 wt % acrylic resin and 21.1 wt % silicone resin excluding solvent. The irreversible temperature indicating paint has at least six color changes in the temperature range 550° C. to 1250° C. The irreversible temperature indicating paint is used to determine the temperatures to which various parts of turbine blades, turbine vanes or other components are subjected in operation of a gas turbine engine.

7 Claims, No Drawings

TEMPERATURE INDICATING PAINT

The present invention relates to an irreversible temperature indicating paint.

Irreversible temperature indicating paint changes colour at one or more known temperatures. These colour changes of the temperature indicating paint indicate the temperature to which different parts of a component or components have been subjected. The final colour of the irreversible temperature indicating paint is dependent on both the temperature it is subjected to and the time period over which it is held at a raised temperature. The irreversible temperature indicating paint is applied to a component in a test situation and subsequently analysed to determine the temperatures to which different regions of the component reached during the test. Irreversible temperature indicating paints thus produce a temperature profile over the whole surface of a component rather than discrete points, if for example thermocouples are used.

Irreversible temperature indicating paints are applied to components, for example turbine blades, turbine vanes and combustors, of gas turbine engines and the gas turbine engine is run at the gas turbine engines normal operating conditions.

One known temperature indicating paint described in our UK patent GB1103059 comprises principally lead chromate, magnesium carbonate and silica.

Another known temperature indicating paint described in our UK patent GB2204874 comprises one or more of silver, gold, platinum, palladium, copper, nickel, chromium, titanium and silicon dispersed in 10 to 70 wt % solvent and resin.

Accordingly the present invention seeks to provide a novel irreversible temperature indicating paint which has a plurality of colour changes in the temperature range 550° C. to 1250° C.

Accordingly the present invention provides an irreversible temperature indicating paint comprising cobalt ammonium phosphate, sodium alumino sulpho silicate, silica, alumina, toluidine red, binder and a solvent.

Preferably the binder comprises acrylic resin and silicone resin.

Preferably the irreversible temperature indicating paint comprise 15 wt % to 18 wt % cobalt ammonium phosphate, 5.0 wt % to 6.0 wt % sodium alumino sulpho silicate, 8.5 wt % to 10.5 wt % silica, 7.0 wt % to 8.5 wt % alumina, 0.5 wt % to 0.7 wt % toluidine red, 35 wt % to 43 wt % acrylic resin and 19 wt % to 23 wt % silicone resin excluding solvent.

Preferably the irreversible temperature indicating paint comprise 16 wt % to 17 wt % cobalt ammonium phosphate, 5.25 wt % to 5.75 wt % sodium alumino sulpho silicate, 9.0 wt % to 10.0 wt % silica, 7.5 wt % to 8.2 wt % alumina, 0.5 wt % to 0.7 wt % toluidine red, 37 wt % to 41 wt % acrylic resin and 20 wt % to 22 wt % silicone resin excluding solvent.

Preferably the irreversible temperature indicating paint comprise 16.4 wt % cobalt ammonium phosphate, 5.5 wt % sodium alumino sulpho silicate, 9.4 wt % silica, 7.8 wt % alumina, 0.6 wt % toluidine red, 39.1 wt % acrylic resin and 21.1 wt % silicone resin excluding solvent.

Preferably the solvent comprises a mixture of propylene glycol ethers. Preferably the solvent comprises a mixture of 80% 1-methoxy-2-propanol and 20% dipropylene glycol monomethyl ether.

The present invention will be more fully described by way of example.

An irreversible temperature indicating paint according to the present invention has six or more colour changes in the temperature range 550° C. to 1250° C. when run at maximum operating conditions of a gas turbine engine, or other engine, for 3 minutes.

The irreversible temperature indicating paint comprises cobalt ammonium phosphate, sodium alumino sulpho silicate, silica, alumina, toluidine red a binder and a solvent. The binder preferably comprises acrylic resin and silicone resin.

The solvent preferably comprises a mixture of propylene glycol ethers. Preferably the solvent comprises a mixture of 80% 1-methoxy-2-propanol and 20% dipropylene glycol monomethyl ether. The amount of solvent used depends upon the particular method of applying the paint.

The irreversible temperature indicating paint comprise 15 wt % to 18 wt % cobalt ammonium phosphate, 5.0 wt % to 6.0 wt % sodium alumino sulpho silicate, 8.5 wt % to 10.5 wt % silica, 7.0 wt % to 8.5 wt % alumina, 0.5 wt % to 0.7 wt % toluidine red, 35 wt % to 43 wt % acrylic resin and 19 wt % to 23 wt % silicone resin excluding solvent.

The irreversible temperature indicating paint comprise 16 wt % to 17 wt % cobalt ammonium phosphate, 5.25 wt % to 5.75 wt % sodium alumino sulpho silicate, 9.0 wt % to 10.0 wt % silica, 7.5 wt % to 8.2 wt % alumina, 0.5 wt % to 0.7 wt % toluidine red, 37 to 41 wt % acrylic resin and 20 wt % to 22 wt % silicone resin excluding solvent.

One example of an irreversible temperature indicating paint comprises 16.4 wt % cobalt ammonium phosphate ($NH_4CoPO_4$), 5.5 wt % sodium alumino sulpho silicate (NaAlSSiO), 9.4 wt % silica ($SiO_2$), 7.8 wt % alumina ($Al_2O_3$), 0.6 wt % toluidine red, 39.1 wt % acrylic resin and 21.1 wt % silicone resin excluding solvent.

If this paint is run for 3 minutes at maximum operating temperature of the gas turbine engine there are six or more colour changes in the temperature range of 550° C. to 1250° C. The paint is pale blue-grey in colour between 550° C. and 870° C., changes to dark blue-grey at 870° C., changes to blue at 1010° C., changes to midnight blue at 1140° C., changes to matt black at 1200° C., changes to matt black glaze at 1220° C., changes to dark blue glaze at 1250° C.

The irreversible temperature indicating paint is applied to turbine blades or turbine vanes or other components of gas turbine engines. The irreversible temperature indicating paint is used to determine the temperatures to which various parts of the turbine blade, turbine vane or other component are subjected in operation of the gas turbine engine.

The irreversible temperature indicating paint may be used on components in other engines or other machines or other apparatus to determine the temperature to which various parts of the component are subjected in operation.

I claim:

1. An irreversible temperature indicating paint comprising cobalt ammonium phosphate, sodium alumino sulpho silicate, silica, alumina, toluidine red, binder and a solvent.

2. An irreversible temperature indicating paint as claimed in claim 1 wherein the binder comprises acrylic resin and silicone resin.

3. An irreversible temperature indicating paint as claimed in claim 2 comprising 15 wt % to 18 wt % cobalt ammonium phosphate, 5.0 wt % to 6.0 wt % sodium alumino sulpho silicate, 8.5 wt % to 10.5 wt % silica, 7.0 wt % to 8.5 wt % alumina, 0.5 wt % to 0.7 wt % toluidine red, 35 wt % to 43 wt % acrylic resin and 19 wt % to 23 wt % silicone resin excluding solvent.

4. An irreversible temperature indicating paint as claimed in claim 3 comprising 16 wt % to 17 wt % cobalt ammonium phosphate, 5.25 wt % to 5.75 wt % sodium alumino sulpho silicate, 9.0 wt % to 10.0 wt % silica, 7.5 wt % to 8.2 wt % alumina, 0.5 wt % to 0.7 wt % toluidine red, 37 wt % to 41 wt % acrylic resin and 20 wt % to 22 wt % silicone resin excluding solvent.

5. An irreversible temperature indicating paint as claimed in claim 4 comprising 16.4 wt % cobalt ammonium phosphate, 5.5 wt % sodium alumino sulpho silicate, 9.4 wt % silica, 7.8 wt % alumina, 0.6 wt % toluidine red, 39.1 wt % acrylic resin and 21.1 wt % silicone resin excluding solvent.

6. An irreversible temperature indicating paint as claimed in claim 1 wherein the solvent comprises a mixture of propylene glycol ethers.

7. An irreversible temperature indicating paint as claimed in claim 6 wherein the solvent comprises a mixture of 80% 1-methoxy-2-propanol and 20% dipropylene glycol monomethyl ether.

* * * * *